June 5, 1934.   A. O. ABBOTT, JR   1,961,726
APPARATUS FOR TESTING TIRES
Filed July 20, 1928   3 Sheets-Sheet 2
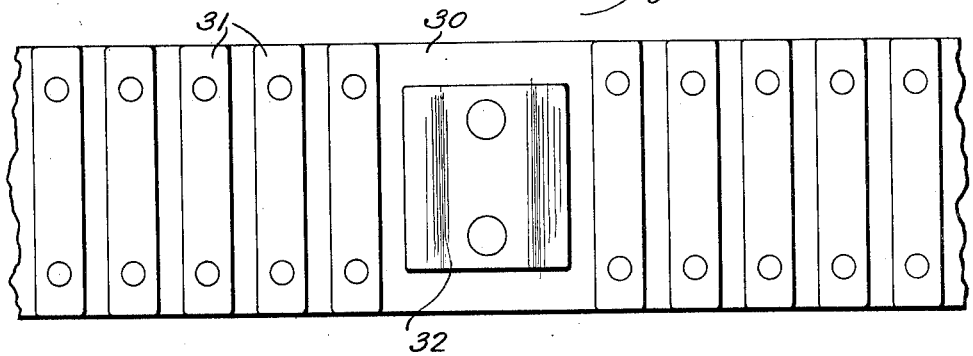
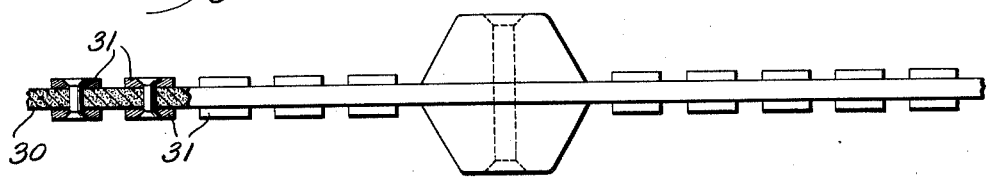
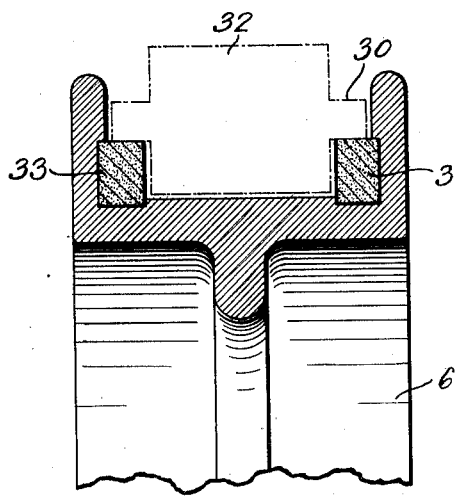
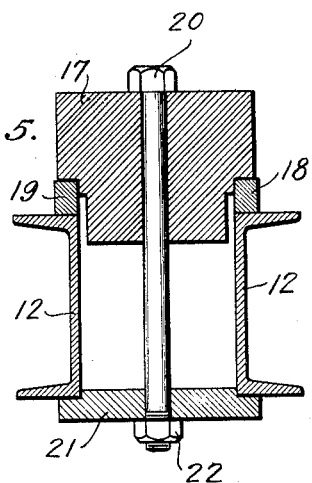
INVENTOR.
Adrian O. Abbott, Jr.
BY
ATTORNEYS.

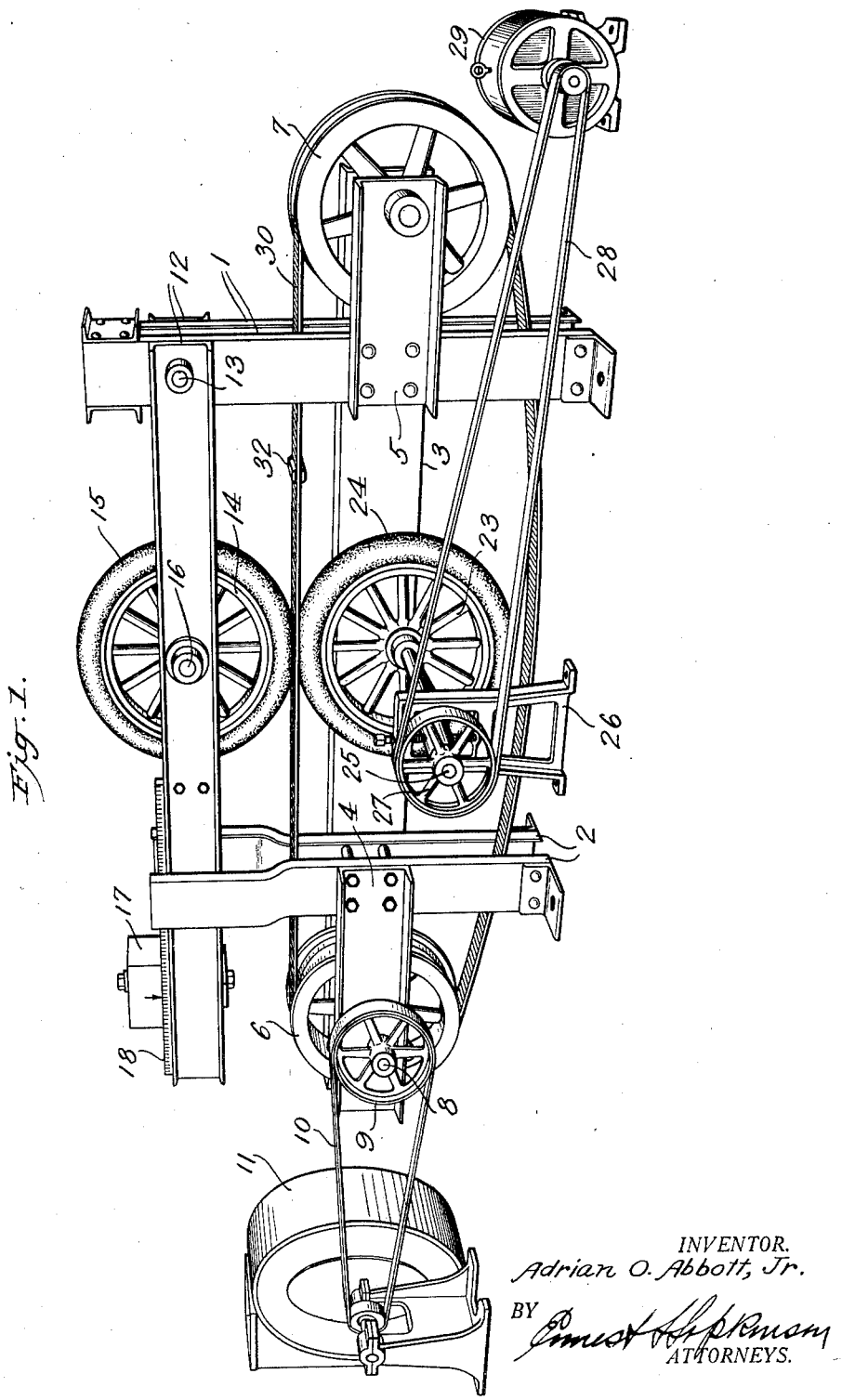

June 5, 1934. A. O. ABBOTT, JR 1,961,726
APPARATUS FOR TESTING TIRES
Filed July 20, 1928 3 Sheets-Sheet 3
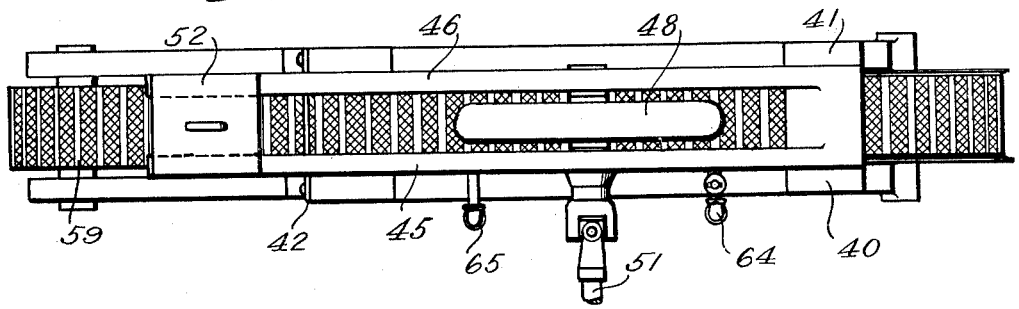
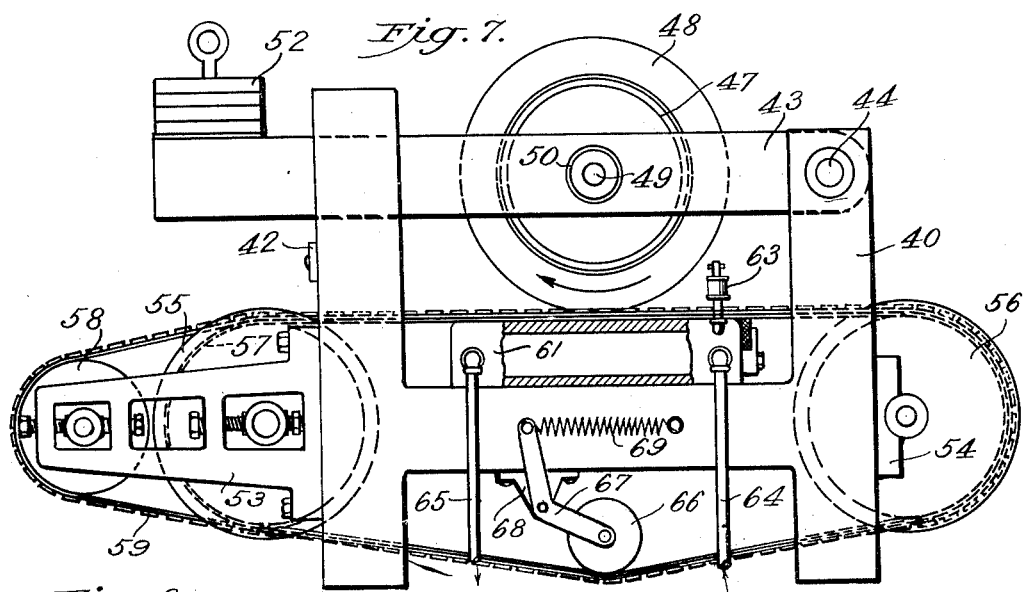
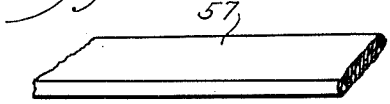
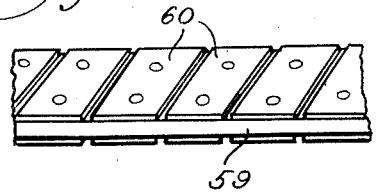
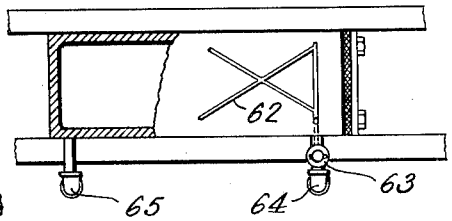
INVENTOR
Adrian O. Abbott, Jr.
BY
ATTORNEY

UNITED STATES PATENT OFFICE 1,961,726

APPARATUS FOR TESTING TIRES

Adrian O. Abbott, Jr., Detroit, Mich., assignor to Morgan & Wright, Detroit, Mich., a corporation of Michigan Application July 20, 1928, Serial No. 294,086

10 Claims. (Cl. 73—51)

This invention relates to a machine whereby tires such as automobile tires may be more efficiently tested.

Heretofore in testing tires it has been customary to provide an automobile with a set of the tires to be tested and drive the automobile over roads until the requisite number of miles has been covered in order to determine the resistance to wear of the tires.

Another method of testing tires has been to mount the tire on a wheel adjacent a rotatable drum with the tread of the tire in contact with the periphery of the drum and to drive the drum thereby rotating both the tire and drum against some suitable resistance until the tire has been rotated a number of times equivalent to the number of miles for which it is to be tested and the wear of the tire measured as compared with that of similar tires so tested.

It is the object of my invention to provide a machine in which one or more tires may be tested under conditions simulating road conditions. It is also an object of my invention to provide testing means whereby various conditions such as might arise in the actual use of a tire may be presented to the tire under test. It is also an object of my invention to provide a machine in which the driving force acts through the tire as it does in actual use of tires. Other objects of my invention will become apparent in the detailed description which follows.

In the drawings:

Fig. 1 is a perspective view of one embodiment of my invention.

Figs. 2 and 3 are detail views of the belt used in my invention.

Figs. 4 and 5 are detail sectional views of parts of my machine.

Fig. 6 is a plan view of a second modification of my invention.

Fig. 7 is a side elevation of the machine shown in Fig. 6.

Figs. 8, 9 and 10 are detail views of parts of the machine shown in Fig. 6.

Referring particularly to the modification shown in Figs. 1-5, the machine consists of a base composed of a pair of upright members 1 which are connected to a second pair of upright members 2 by the horizontal beam 3. Extension beams 4 and 5 extend in parallel relation to the end portions of the beam 3 and are suitably mounted in the upright members 2 and 1 respectively as by means of rivets. Pulleys 6 and 7 are mounted in suitable bearings between the extension 4 and the member 3 and between the extension 5 and the member 3 respectively. The pulley 6 is keyed on the shaft 8 which carries rigidly the pulley 9 connected by belt 10 with a mechanical resistance such as the fan 11.

Adjacent the upper end of the upright members 1 is pivotally supported, by means of the pin 13, a pair of parallel and horizontally extending beams 12. The ends of beams 12 oscillate vertically in the yoke formed by the upper ends of the upright members 2 which yoke prevents lateral motion of the beams. A wheel 14 carrying a tire 15 is keyed to the shaft 16 which is rotatably mounted in suitable bearings intermediate the ends of the beams 12. At the ends of the beams 12 distant from the pin 13 is a weight 17 slidably mounted on bars 18 and 19 suitably secured on the tops of the beams 12, as shown in Fig. 5. Bar 18 carries graduations with which the arrow carried by the weight 17 cooperates to indicate the load applied on the tire 15. A bolt 20 (see Fig. 5) extends through the weight 17 and through a plate 21 contacting with the under sides of the beams 12 distant from the bars 18 and 19. A nut 22 on the end of bolt 21 serves to clamp the weight 17 and block 21 against sliding movement after the weight has been adjusted to desired position. It is obvious that various sizes of weights may be employed.

A wheel 23 carrying tire 24 is keyed upon the shaft 25 which is mounted in suitable bearings in the beam 3 and the bracket 26. The shaft 25 carries rigidly a pulley 27 which is connected by a belt 28 with a source of power such as an electric motor 29.

A belt 30 is trained over the pulleys 6 and 7 and extends, at its upper reach, between the tires 15 and 24. The belt 30, which may be of fabric or rubberized fabric or of any suitable type of belt, has mounted thereon blocks 31 preferably of brass or of any other suitable metal, the blocks being secured to the belt by rivets or in any other suitable manner. At various desirable positions along the belt projections of any desired shape such as shown in 32 may be mounted on the belt by rivets or by any other suitable means.

As shown in Fig. 4 rubber rings 33 extend around the periphery of the pulleys 6 and 7 at the edge thereof. These rubber rings serve to support the belt so that the metal projections thereon will not contact with the surface of the pulleys thereby rendering the machine less noisy and also providing better traction between the belt and pulleys.

In the operation of the machine shown in Figs. 1-5 the tires to be tested are mounted upon the wheels 14 and 23. Any suitable type of testing blocks 32 are mounted upon the belt 30 and the weight 17 is adjusted so as to provide the proper load upon the tires. Electric motor 29 is set into operation which drives through the belt 28, pulley 27 and shaft 25, the wheel 23 thereby rotating the tire 24 which motion is transmitted to the belt 30 and the tire 15. The motion of the belt 30 is transmitted through shaft 8, pulley 9, belt 10 to the fan 11 which serves to provide a resistance to the motion of the belt and tires, such as would be encountered by tires in actual use. The amount of the resistance offered by the fan 11 may be controlled by varying the outlet of the air from the fan. It is obvious that other suitable mechanical loads may be used instead of the fan 11 in order to provide resistance to the motion of the belt and tires.

It will be seen from the description of the machine that the tires are tested under conditions simulating those of actual use inasmuch as the driving force is applied through at least one of the tires, as in the case when tires are in actual use, said driving force acting against a resistance which may be made comparable to that arising when tires are in use on automobiles. Furthermore the type of obstacles, in the form of projections 32, placed upon the belt may be varied to produce conditions similar to any which might be found in actual use.

The second modification of my invention is shown in Figs. 6-10. The machine shown in Figs. 6-10 comprises a base formed of H-shaped upright members 40 and 41 which are held in spaced parallel relation by braces such as 42. A bifurcated support 43 is rotatably mounted on the pin 44 between upper ends of the supporting members 40 and 41. The bifurcated supporting member 43 has arms 45, 46 between which a wheel 47 carrying tire 48 is mounted. The wheel 47 is keyed to the shaft 49 which is supported in suitable bearings 50 in the arms 45 and 46. A shaft 51 is connected with the shaft 49 and serves to drive the wheel 47 from a suitable source of power, not shown. At the ends of the arms 45 and 46 distant from the pin 44 are provided weights 52 for loading tire 48. The weights 52 may be varied either in amount or in position so as to vary the load upon the tire 48. Free ends of arms 45 and 46 oscillate vertically between extensions of the upright members 40 and 41, which extensions prevent lateral movement of the arms.

Base members 40 and 41 carry brackets 53 and 54 provided with suitable bearings in which bearings the pulleys 55 and 56 are journalled respectively. A belt 57 of steel or fabric impervious to oil or of any other suitable material is trained over the pulleys 55 and 56. This belt 57 may be provided with projections on its surface of brass or other suitable material if so desired. The bracket 53 also carries a pulley 58 rotatable in suitable bearings carried by the bracket. A belt 59 is trained over the pulley 58 and the pulley 56, said belt extending over the belt 57 as shown in Fig. 7. The belt 59 is provided with projections 60 of brass or other suitable metal which projections are fastened to the belt by rivets or by other suitable means.

The horizontal portions of the base members 40 and 41 carry a box 61 of metal or other suitable material over the top surface of which the belts 57 and 59 slide. The top surface of the box 61 is provided with oil grooves 62 supplied with oil from the oil cup 63 so as to facilitate the motion of the belts over the top surface of the box. Pipe connections 64 and 65 supply a continuous circulation of water through the box 61 so as to keep the top surface of the box at a moderate temperature.

The belts 57 and 59 are tensioned by means of the roller 66 which contacts the belts in their lower reach. The roller 66 is carried in one end of bell crank lever 67 pivotally mounted in bracket 68 which is carried by the frame members 40 and 41. A spring 69 connects the end of the bell crank lever opposite the roller 66 with the frame so as to provide a tensioning force.

In the operation of the machine shown in Figs. 6-10 the tire to be tested is mounted upon the wheel 47, the weights 52 are adjusted to provide a suitable load on the tire. Oil is supplied to the oil grooves 62 from the oil cup 63 and water is set into circulation through the box 61 by means of the pipes 64 and 65. A source of power is then set into operation to drive the wheel 47 through the shaft 51. The rotation of the wheel 47 rotates the tire 48, the motion of which is transmitted to the belts 57 and 59. The frictional contact of the belt 57 with the top of the box 61 provides a constant resistance to the motion of the tire and the belts, which simulates the resistance offered to tires in actual use.

The purpose of the double belts is to prevent the oil on the top surface of the box 61 from attaining access to the tire 48 since the belt 57 is made of steel or oil-proof fabric so as to prevent the penetration of the oil through the belt 57 to the belt 59. The belt 59 which due to the use of rivets for mounting the blocks 60 thereon cannot readily be made so as to be impervious to oil so that the use of the belt 57 to protect the tire from the lubricant on the top surface of the box 61 is advantageous.

It will be obvious from the above description and the showing in the drawings that the applicant has provided a machine which tests tires under conditions much like those of actual use, inasmuch as the travelling belt 59 is provided with projections which subject the tire to wear similar to that of actual use. Furthermore the driving force is applied to the tire as in the case of a tire in use and the tire is subjected to a load which may be made comparable to that ordinarily applied to tires. The resistance to the motion of the belts 57 and 59 offered by the friction of the top surface of box 61 simulates the resistance offered to a tire under driving conditions.

While I have disclosed certain embodiments of my invention, it is obvious that many modifications may be made in the details of my machine which lie within the scope of my invention. For an understanding of the scope of my invention reference may be made to the following claims.

Having thus described my invention, what I claim and desire to protect by Letters Patent is:

1. A tire testing machine having in combination, a movable belt having flat surfaces, wheels arranged on each side of the belt for carrying tires, means for rotatably supporting the wheels, the tires contacting with opposite sides of the belt.

2. A tire testing machine having in combination, a movable belt having flat surfaces, wheels arranged on each side of the belt for carrying tires, means for rotatably supporting the wheels, the tires contacting with opposite sides of the belt, and obstacles on the belt for subjecting the tires to various testing conditions.

3. A tire testing machine having in combination, a movable belt having flat surfaces, wheels arranged on each side of the belt for carrying tires, means for rotatably supporting the wheels, the tires contacting with opposite sides of the belt, means connected with the belt to provide resistance to the motion of the belt, and means for driving one of the wheels.

4. A tire testing machine having in combination, a movable belt having flat surfaces, wheels arranged on each side of the belt for carrying tires, means for rotatably supporting the wheels, the tires contacting with opposite sides of the belt, means for driving one of the wheels and obstacles on the belt for subjecting the tires to various testing conditions.

5. A tire testing machine having in combination a movable belt, wheels arranged on opposite sides of one reach of the belt and adapted to carry tires in contact with the belt, a frame mounted for oscillation to and from the belt, one of said wheels being rotatably mounted in said frame, and means for driving the other of said wheels.

6. A tire testing machine having in combination a movable belt, wheels arranged on opposite sides of one reach of the belt and adapted to carry tires in contact with the belt, a frame mounted for oscillation to and from the belt, one of said wheels being rotatably mounted in said frame, means for driving the other of said wheels, and means for providing resistance to the motion of the belt.

7. A tire testing machine having in combination a movable belt, wheels arranged on opposite sides of the belt and adapted to carry tires in contact with opposite sides of the same portion of the belt, said belt having obstacles thereon adapted to subject the tires to conditions simulating use, a weighted frame oscillatable to and from the belt, one of said wheels being rotatably carried by said frame, means for rotatably supporting the other of said wheels, and means for rotating the last mentioned wheel.

8. A tire testing machine having in combination a movable belt, wheels arranged on opposite sides of the belt and adapted to carry tires in contact with opposite sides of the same portion of the belt, said belt having obstacles thereon adapted to subject the tires to conditions simulating use, a weighted frame oscillatable to and from the belt, one of said wheels being rotatably carried by said frame, means for rotatably supporting the other of said wheels, means for rotating the last mentioned wheel, and means for providing a resistance to the motion of the belt.

9. A tire testing machine comprising, a stationary support, a lever having one end pivotally connected to said support, a relatively movable weight supported by said lever, means for rotatably supporting a tire on said lever, an endless flexible track for engaging a tire being tested, and means for moving the tire and track.

10. A tire testing machine comprising, a stationary support, a lever having one end pivotally connected to said support, a relatively movable weight supported by said lever, means for rotatably supporting a tire on said lever, an endless flexible track for engaging the tire on said lever while being tested, means for moving the tire and track, and means for offering resistance to the movement of said track.

ADRIAN O. ABBOTT, Jr.